Oct. 16, 1962 W. RICHTER ET AL 3,059,176
MEASURING SYSTEMS
Filed Oct. 8, 1958 2 Sheets-Sheet 1

Inventors
Walther Richter
Merle R. Dwinehart
By H. R. Rather
Attorney

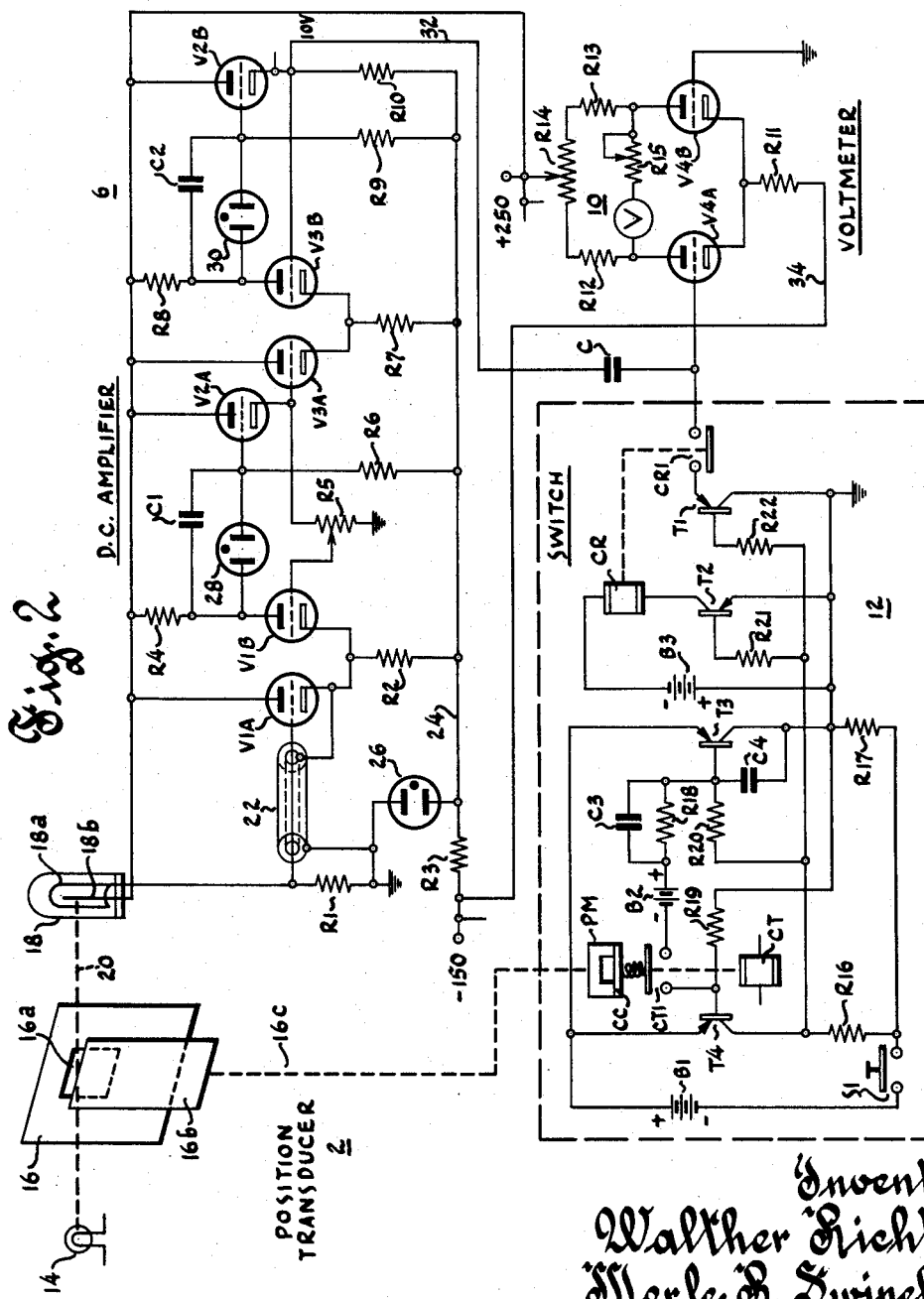

3,059,176
MEASURING SYSTEMS
Walther Richter, River Hills, and Merle R. Swinehart, Milwaukee, Wis., assignors to Cutler-Hammer, Inc., Milwaukee, Wis., a corporation of Delaware
Filed Oct. 8, 1953, Ser. No. 766,045
19 Claims. (Cl. 324—28)

This invention relates to measuring systems and more particularly to systems for measuring the motion of a movable element or the velocity of such motion.

While not limited thereto, the invention is especially applicable to systems for measuring the follow-up of electrical contacts, the total stroke of movable contacts and the velocity of movement of such contacts and the like under normal contact operating conditions.

A general object of the invention is to provide improved measuring systems.

A more specific object of the invention is to provide improved means for measuring the follow-up of electrical contacts while the contacts are operated in the normal manner.

Another specific object of the invention is to provide improved means for measuring the total stroke of movable electrical contacts while the contacts are operated in the normal manner.

Another specific object of the invention is to provide improved means for measuring the velocity of movement of electrical contacts under normal contact operating conditions.

Another object of the invention is to provide improved means whereby the features specified in the aforementioned objects are combined in a unitary measuring device.

Other objects and advantages of the invention will hereinafter appear.

While the apparatus hereinafter described is effectively adapted to fulfill the objects stated, it is to be understood that we do not intend to confine our invention to the particular preferred embodiments of measuring systems disclosed, inasmuch as they are susceptible of various modifications without departing from the scope of the appended claims.

The invention will now be described in detail with reference to the accompanying drawings, wherein:

FIG. 2 is a schematic illustration of one embodiment of the measuring system of FIG. 1;

Figure 1:
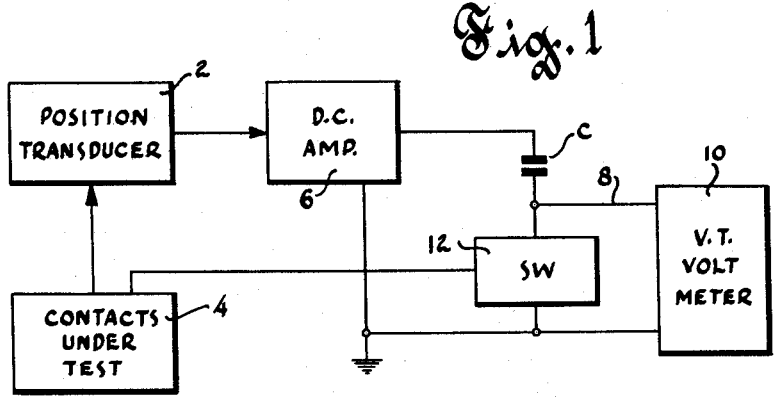
FIGURE 1 is a block diagram of a measuring system constructed in accordance with the invention.

Referring to FIG. 1, there is shown in block diagram a measuring system having a position transducer 2 which responds to movement of a contact 4 being tested. The position transducer develops a signal voltage proportional to contact movement and applies the same to an amplifier 6. The amplified output signal voltage from amplifier 6 is applied through a capacitor C and conductor 8 to a vacuum tube voltmeter 10 to exhibit an indication of contact movement as determined by the operation of switching network 12.

To provide an indication of the total stroke of contact 4, switch 12 is caused to open just before the contact starts to move. To provide an indication of the follow-up of contact 4, that is, the amount of movement of the contact carrier from the point where the contacts touch to the point where the armature of the contact operator seals, switch 12 is caused to open when the contacts touch. To provide an indication of contact velocity, switch 12 is left open as hereinafter more fully described.

Referring to FIG. 2, there is shown in the upper left-hand portion a position transducer 2 having a light source 14, a light shield 16 of opaque material provided with a light aperture 16a, a shutter 16b normally covering aperture 16a, a permanent magnet PM mechanically connected to shutter 16b, as indicated by broken line 16c and a photo-electric cell 18. The photo-electric cell and light source are on opposite sides of the light shield so that when the shutter is opened the photo-electric cell intercepts the light beam passing through the aperture as indicated by broken line 20. Permanent magnet PM secures thin metal shutter 16b to the contact carrier CC of contact CT1 under test so that the shutter opens in response to movement of the contact carrier. The contact carrier may be connected to the movable contact by a partially compressed helical spring or the like.

Photo-electric cell 18 is provided with a semi-cylindrical cathode 18a and an anode 18b formed of thin wire or the like in a well known manner. Cathode 18a is connected through a resistor R1 to ground while anode 18b is connected to the anode supply voltage of amplifier 6 which for exemplary purposes may be 250 volts positive. A double-shielded transmission line 22 is provided for conveying the signal from photo-cell 18 to the two-section direct current amplifier 6.

The first section of the amplifier comprises electric discharge devices V1A, V1B and V2A and the second section comprises electric discharge devices V3A, V3B and V2B, these devices being of the vacuum tube duo-triode type or the like. The cathodes of tubes V1A and V1B are connected together and then through a resistor R2 to a common conductor 24, the latter being connected through a resistor R3 to a cathode supply voltage which for exemplary purposes may be 150 volts negative. Conductor 24 is also connected through a voltage regulating tube 26 of the cold-cathode glow discharge diode type or the like to ground. The anode of tube V1A is connected directly and the anode of tube V1B is connected through a resistor R4 to the aforementioned anode supply voltage. The junction of cathode 18a of photo-cell 18 and resistor R1 is connected through the central conductor of transmission line 22 to the control grid of tube V1A. The cathode of tube V1A is connected to the inner coaxial shield of transmission line 22 and the outer coaxial shield of the latter is connected to ground to prevent the transmission line capacitance and the resistance of the photo-cell circuit from producing a troublesome signal delay. The anode of tube V1B is connected through a voltage regulating tube 28 similar to tube 26 to the control grid of cathode follower tube V2A, tube 28 being shunted by a filter capacitor C1. The cathode of tube V2A is connected to the control grid of tube V3A of the second amplifier stage. A negative feedback circuit extends from the cathode of tube V2A to the control grid of tube V1B. To this end, the cathode of tube V2A is connected through a resistor R5 to ground and a movable gain-adjusting slider on resistor R5 is connected back to the control grid of tube V1B. Also the control grid of tube V2A is connected through a resistor R6 to cathode supply voltage conductor 24.

The second amplifier stage is similar to the first hereinbefore described except that a direct negative feedback connection is provided to afford a gain of substantially unity and a low impedance output. Thus, the cathodes of tubes V3A and V3B are connected together and then through a resistor R7 to conductor 24 while the anode of tube V3A is connected directly and the anode of tube V3B is connected through a resistor R8 to the aforementioned anode supply voltage. The anode of tube V3B is also connected through a voltage regulating tube 30 to the control grid of tube V2B, tube 30 being shunted by a filter capacitor C2. The control grid of tube V2B is connected through a resistor R9 to conductor 24, the cathode thereof is connected through a resistor R10 to conductor 24 and the anode thereof is connected directly to the aforementioned anode supply voltage. A direct connection for negative feedback extends from the cathode of tube V2B back to the control grid of tube V3B.

The output of amplifier 6 is connected from the cathode of cathode follower tube V2B through a conductor 32 and capacitor C to a differential amplifier network 10. Network 10 is provided with a pair of electric discharge devices V4A and V4B of the vacuum tube triode type or the like having their cathodes connected together and then through a resistor R11 and a conductor 34 to the aforementioned cathode supply voltage. The anodes are connected through resistors R12 and R13 to opposite ends of a balancing resistor R14, the latter having an adjustable slider connected to the aforementioned anode supply voltage for balancing the network. A voltmeter V is connected in series with an adjustable resistor R15 across the anodes of tubes V4A and V4B. The control grid of tube V4B is connected to ground and the control grid of tube V4A is connected through the aforementioned capacitor C and conductor 32 to the output of amplifier 6.

The control grid of tube V4A is also connectable to ground through switching network 12. Network 12 is provided with a switching transistor T1, a transistor T2 for operating a control relay CR and a pair of transistors T3 and T4 connected in a flip-flop circuit. The emitter electrodes of transistors T4 and T3 are connected to the positive side of a direct current source such as a battery B1 and the negative side of the battery is connected through a manual switch S1 and then in two branches through resistors R16 and R17 to the collector electrodes of transistors T4 and T3, respectively. The negative terminal of a battery B2 is connectable through contact CT1 under test to the base of transistor T4 and the positive terminal of battery B2 is connected through parallel connected resistor R18 and capacitor C3 to the base of transistor T3. The collector electrode of transistor T3 is connected through a resistor R19 to the base of transistor T4 and the collector electrode of transistor T4 is connected through a resistor R20 to the base of transistor T3. A capacitor C4 is connected between the base and collector electrodes of transistor T3.

A biasing circuit extends from the collector electrode of transistor T4 through resistors R21 and R22 in two branches to the respective bases of transistors T2 and T1. The collector electrode of transistor T3 is connected to ground. A battery B3 for operating relay CR is connected in a circuit extending from the positive terminal of the battery through the emitter and collector electrodes of transistor T2 and the operating coil of relay CR to the negative terminal of battery B3, the emitter electrode of transistor T2 being also connected to ground. The aforementioned control grid of tube V4A in the differential amplifier network is connectable through normally open contact CR1 of relay CR and the emitter and collector electrodes of transistor T1 to ground.

The operation of the system of FIG. 2 will now be described. To make a follow-up measurement of contact CT1, switch S1 is closed. As a result, a negative bias is applied from battery B1 through switch S1, resistor R17 and capacitor C4 to the base of transistor T3 to cause the circuit to "flip" and render transistor T3 conducting. This conducting circuit may be traced from the positive side of battery B1 through the emitter and collector electrodes of transistor T3, resistor R17 and switch S1 to the negative side of the battery. While capacitor C4 is shown connected between the collector and base electrodes of transistor T3, it will be apparent that an equivalent connection therefor would be across resistor R20. In the latter case, the negative bias would be applied from the negative side of battery B1 through switch S1, resistor R16 and capacitor C4 to the base of transistor T3. Capacitor C4 insures that transistor T3 rather than transistor T4 is rendered conducting when switch S1 is closed. This is for the reason that the bias applied through resistor R17 and capacitor C4 to the base of transistor T3 is more negative than that applied through resistors R17 and R19 to the base of transistor T4.

The effect of the aforementioned operation is to also apply a negative bias from battery B1 through switch S1 and resistor R16 and then in parallel through resistors R21 and R22 to the bases of transistors T2 and T1, respectively, to render transistor T2 conducting. Thus, a conducting circuit is established from the positive side of battery B3 through the emitter and collector electrodes of transistor T2 and the operating coil of relay CR to the negative side of the battery to energize relay CR and close contact CR1. Closure of contacts CR1 effects conduction of transistor T1 in response to the aforementioned negative bias applied through resistor R22 to its base and a signal voltage to be applied to its emitter electrode as hereinafter described. As a result of conduction in transistor T3, a positive bias is applied from the junction of its collector electrode and resistor R17 through resistor R19 to the base of transistor T4 to maintain the latter non-conducting.

Figure 4:
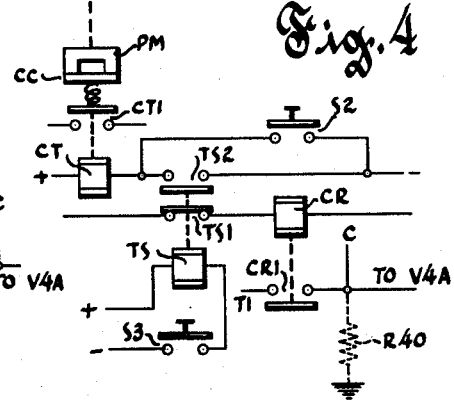
FIG. 4 is a schematic illustration of further modifications which may be added to the system of FIG. 2 or the modified system of FIG. 3.

Closure of contact CT1 under test may then be initiated by suitable means such as for example the operating coil CT also shown in FIG. 4. As contact CT1 closes, magnet PM which is magnetically held to contact carrier CC progressively opens shutter 16b in accordance with the movement of the contact carrier. The increasing light beam 20 thus admitted impinges on the cathode of the photo-cell whereby the latter produces a signal voltage output across load resistor R1. This signal voltage is applied from the junction of cathode 18a and resistor R1 through transmission line 22 to the control grid of tube V1A which constitutes the input of amplifier 6. The shields on line 22 prevent pickup of spurious voltages such as 60 cycle power line voltage and the like. The signal from the photo-cell is amplified in amplifier 6 and applied from the cathode follower output of the latter through conductor 32, capacitor C, contact CR1 and the emitter and collector electrodes of transistor T1 to ground. For exemplary purposes, it may be assumed that the first section of amplifier 6 provides a voltage gain of 10 as set at resistor R5 and the second section provides a voltage gain of substantially unity to afford a low impedance output. The amplified signal charges capacitor C as a function of the closing movement of contact CT1.

The amount of movement of contact carrier CC from the time the contacts touch until the armature of the operating magnet seals constitutes the follow-up to be measured. When the movable portion of contact CT1 touches the stationary contacts, the circuit of transistors T3 and T4 is caused to "flop." To this end, a negative bias is applied from battery B2 through contact CT1 to the base of transistor T4 to render the latter conducting. And a positive bias voltage is applied from battery B2 through parallel-connected capacitor C3 and resistor R18 to the base of transistor T3 to render the latter non-conducting. The conducting circuit of transistor T4 may be traced from the positive side of battery B1 through the emitter and collector electrodes, resistor R16 and switch S1 to the negative side of the battery. Conduction of transistor T4 effects application of a positive bias from the junction of its collector electrode and resistor R16 in three branches through resistors R20, R21 and R22 to the bases of transistors T3, T2 and T1, respectively. This positive bias maintains transistor T3 in the non-conductive state and renders transistors T2 and T1 non-conducting.

It will be apparent that transistor T1 functions as a switch, and when rendered non-conducting as aforesaid, effectively disconnects ground from the control electrode of tube V4A. As a result, the increase in signal developed in response to movement of contact carrier CC from the point of touch of the contacts until the armature seals proportionately increases the voltage on the control grid of tube V4A. This increase in signal applied to the control grid of tube V4A unbalances the differential amplifier network 10. Thus, conduction is established from the positive anode supply voltage through the slider and the right-hand portion of resistor R14, resistors R13 and R15, voltmeter V, tube V4A, resistor R11 and conductor 34 to the negative cathode supply voltage. Voltmeter V which is preferably calibrated in thousands of an inch indicates the aforementioned increase in signal voltage and, consequently, the amount of follow-up of contact CT1.

It will be recalled that when transistor T1 was rendered non-conductive, transistor T2 was simultaneously biased to non-conduction. As a result, the operating coil of relay CR deenergizes and contact CR1 opens to positively disconnect the ground from the control grid of tube V4A. This is required to prevent current leakage through transistor T1 from causing an error in the voltmeter indication. Transistor T1 is also required in the ground connection to obtain instantaneous response and to prevent the inherently slow-acting contact CR1 from causing an error in the voltmeter indication as would be the case if contact CR1 alone were employed in the ground connection.

An amplifier 6 of the type hereinbefore described and including shielded line 22, voltage regulators 26, 28 and 30 and the low impedance output of approximately 20 ohms is required to minimize error in the voltmeter indication. To this end, the cathode follower amplifier input and the connection of the cathode of tube V1A to the inner shield of transmission line 22 prevents the transmission line capacitance and the photo-cell circuit resistance from causing an undesired delay in the signal. The amplification of the signal in conjunction with the low impedance output from the amplifier render negligible the constant error voltages across transistor T1 and contact CR1. Thus, if contact CR1 is always operated at the same velocity of closure, the error will be constant and can be compensated in the calibration of the voltmeter.

Figure 3:
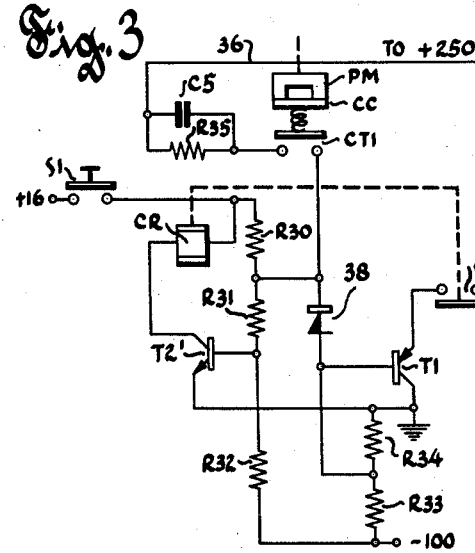
FIG. 3 is a schematic illustration of a modified switching network which may be employed in the system of FIG. 2.

The modified switching network shown in FIG. 3 may be employed in place of the switching network enclosed by broken lines in FIG. 2. The network in FIG. 3 has distinct advantages in that the ungrounded or "floating" batteries such as B1 and B2 of FIG. 2 are not employed and a high voltage is applied across contact CT1 under test to readily break down any contact insulating films, rather than a low voltage as in FIG. 2.

In FIG. 3, reference characters like those of FIG. 2 are employed for like parts. Referring to the switching network of FIG. 3, there is shown a permanent magnet PM magnetically held to carrier CC of contact CT1 for operating the shutter. A direct current voltage which may readily be obtained with a voltage doubler or the like from the vacuum tube filament supply (not shown) is connected to terminal plus 16 to supply a circuit extending through normally open switch S1, the operating coil of relay CR and the collector and emitter electrodes of transistor T2' to ground. A voltage divider comprising resistors R30, R31 and R32 in series is connected from the junction of switch S1 and the operating coil of relay CR to a negative voltage supply which may be minus 100 volts or the like. Another voltage divider comprising resistors R33 and R34 in series is connected from the aforementioned negative voltage supply to ground. The test contact is connected in a circuit extending from the aforementioned anode supply voltage shown in the right-hand portion of FIG. 2 through a conductor 36, parallel-connected capacitor C5 and high resistor R35, contact CT1 and diode 38 to the junction of voltage divider resistors R33 and R34. The junction of resistors R30 and R31 is connected to the junction of contact CT1 and diode 38 to control operation of transistor T2'. The junction of resistors R31 and R32 is connected to the base of transistor T2' to bias the latter. The junction of resistors R33 and R34 is also connected to the base of transistor T1 to bias the latter. Normally open contact CR1 of relay CR is connected from the control grid of tube V4A through the emitter and collector electrodes of transistor T1 to ground as in FIG. 2.

The operation of the switching network of FIG. 3 will now be described, recalling that it is employed in conjunction with the position transducer, amplifier, differential amplifier and voltmeter of FIG. 2. It will be apparent from the symbols employed that transistor T1 is a P-N-P junction type element as in FIG. 2 requiring a negative base current to bias the same for conduction and a positive base voltage to bias the same for non-conduction. On the other hand, transistor T2' is an N-P-N junction type element requiring a positive base current to bias the same for conduction and a negative base voltage to bias the same for non-conduction. The arrows on the respective emitter electrodes thereof indicate the direction of current flow therethrough to the utilization circuit.

It will be apparent that a negative base-to-collector electrode bias is applied from the junction of resistors R33 and R34 and ground to bias transistor T1 for conduction. Closure of switch S1 effects energization of the operating coil of relay CR in the circuit through transistor T2' to ground hereinbefore described. To this end, a positive bias is applied to the base of transistor T2' from the junction of resistors R31 and R32 to render transistor T2' conducting, thus to energize relay CR. Contact CR1 closes and transistor T1 being biased for conduction, the control grid of tube V4A is connected to ground to render the voltmeter unresponsive. When closure of contact CT1 under test is initiated, capacitor C charges as described in connection with FIG. 2. When the movable portion of contact CT1 touches the stationary portions to close the same, a high voltage pulse is transmitted from the aforementioned anode supply source through capacitor C5, contact CT1, diode 38 and resistor R34 to ground.

Diode 38 may be any suitable gating device which remains non-conductive but fires or "breaks down" to conduct in response to a high voltage or high voltage pulse. Diode 38 may preferably be a four-layer diode or "dynistor diode" which responds to a high voltage pulse to become conducting. Non-conductivity thereof it attained by opening followed by reclosure of switch S1.

The aforementioned high voltage pulse renders diode 38 conducting and conduction thereof is maintained by the positive voltage applied thereto from the junction of resistors R30 and R31. Conduction in diode 38 effects application of a positive base-to-collector electrode bias from the junction of diode 38 and resistor R34 to the base of transistor T1 to render the latter non-conducting, thus to effectively disconnect ground from the control grid of tube V4A. Also a negative bias is applied from the junction of contact CT1 and diode 38 through resistor R31 to the base of transistor T2' to render the latter non-conducting and deenergize relay CR. In order to obtain first a positive bias for conduction of transistor T2' and then, when contacts CT1 touch, a negative bias to render transistor T2' non-conducting, it is necessary that resistor R31 have a substantially higher value than resistor R30 and that resistor R32 have a substantially higher value than resistor R31. It will be recalled that the original biasing circuit for conduction extended from positive source 16 through switch S1 and resistors R30, R31 and R32 to the negative source. Under this condition, the junction of resistors R30 and R31 is at a given positive potential and a positive bias is applied from the junction of resistors R31 and R32 to render transistor T2' conducting. However, when contacts CT1 touch and diode 38 conducts, the current flowing from source 16 through switch S1 and resistor R30 is shunted through diode 38 and resistor R33 to the negative source. If resistors R32 and R33 have equal values, such shunting of the current decreases the potential at the junction of resistors R30 and R31 and such decreased potential is applied through resistor R31 to the base of transistor T2′ to render the latter non-conducting.

Deenergization of relay CR opens contact CR1 to actually disconnect the control grid of tube V4A from ground and this occurs immediately after transistor T1 is rendered non-conductive. As described in connection with FIG. 2, the increase in signal from the touching of the contacts until the armature seals is applied to the control grid of tube V4A and indicated on the voltmeter. The high resistor R35 is provided across capacitor C5 to limit the steady current across contact CT1 for purposes of safety and to discharge capacitor C5 between tests. Diode 38 is restored to its non-conducting state by opening and reclosure of switch S1.

The modification of FIG. 4 shows circuitry which may be added to either the system of FIG. 2 or the system of FIG. 3 to additionally afford measurement of the total stroke of the contact under test or the velocity of contact closure as desired. In FIG. 4, reference characters similar to those of FIGS. 2 and 3 are employed for like parts. Referring to FIG. 4, there is shown the permanent magnet PM, contact carrier CC, contact CT1 under test and operating coil CT for the latter. There is also shown the control relay CR having a contact CR1 in the circuit from the control grid of tube V4A through transistor T1 to ground. Switch S2 may be employed for energizing relay CT as hereinbefore described. There is additionally provided a switch S3 of the manual pushbutton type or the like for energizing a total stroke control relay TS having a normally closed contact TS1 in the energizing circuit of relay CR and a normally open contact TS2 connected across switch S2. The aforementioned elements are provided for total stroke measurement. For velocity measurement, a linear resistor R40 having a value of 50 ohms or the like may alternatively be connected, as indicated by the broken line, between the control grid of tube V4A and ground.

For total stroke measurement, it is necessary to disconnect the control grid of tube V4A from ground just before contact CT1 starts to move. To this end, switch S3 is closed to energize relay TS. It may be assumed that contact TS1 opens before contact TS2 closes. Opening of contact TS1 interrupts energization of relay CR to open contact CR1 and disconnect ground from the control grid of tube V4A. Closure of contact TS2 effects energization of relay CT to initiate closure of contact CT1 under test. As a result, the full increasing signal from the position transducer through amplifier 6 is applied to the control grid of tube V4A and the voltmeter indicates the full stroke of contact CT1 including the follow-up.

In order to measure the velocity of movement of contact CT1 under test, the control grid of tube V4A is connected through resistor R40 to ground by a suitable switch, not shown, and contact CR1 and transistor T1 are disconnected from the control grid. Switch S3 is left open and switch S2 is closed to energize relay CT. The signal developed in response to movement of contact carrier CC of contact CT1 is applied from amplifier 6 through capacitor C and resistor R40 to ground. It will be apparent that the voltage drop across linear resistor R40 is proportional to the rate of change in the signal and consequently proportional to the velocity of movement of contact CT1. This voltage is obtained from the junction of capacitor C and resistor R40. An oscilloscope and camera, not shown, could then be employed to record the velocity of contact movement versus time.

Figure 5:
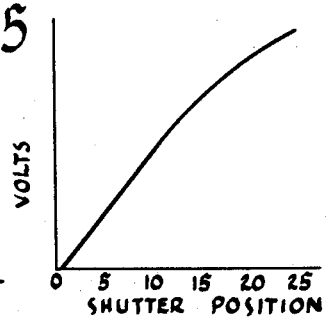
FIGS. 5 and 6 graphically depict operating characteristics of the invention.
Figure 6:
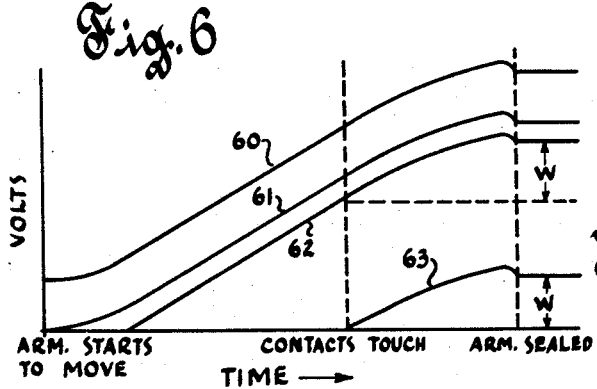

The curves in FIGS. 5 and 6 graphically depict operating characteristics of the position transducer. In FIG. 5, position transducer output volts have been plotted against shutter position. It will be apparent that transducer output is proportional to the displacement of the shutter over a substantial portion of the curve to approximately 12.5 on the horizontal axis. In FIG. 6, transducer output volts proportional to shutter displacement have been plotted against time. Curve 60 depicts the transducer output when the shutter is initially partly open, curve 61 depicts the output when the shutter is initially ready to open and curve 62 depicts the output when the shutter is closed for part of the stroke. The left-hand vertical broken line is indicative of the time when the contacts touch and the right-hand vertical broken line is indicative of the time when the armature seals. It will be apparent that any one of the initial conditions represented by curves 60, 61 and 62 may be employed when contact follow-up is measured. As indicated by curve 62, the increase in voltage from the time when the contacts touch until the armature seals is indicative of the follow-up W. Such follow-up is shown by curve 63. When total stroke is measured, the hereinbefore described conditions depicted by curve 61 are preferred.

While the system has hereinbefore been described as adapted for measurement of a single contact CT1, it will be apparent that it could as will be employed to measure more than one pole of a plural-pole contact set. For this purpose, it would be necessary to duplicate the apparatus beyond amplifier 6 as indicated by the multiple connections at the cathode output of cathode follower tube V2B and adjacent anode supply source plus 250 and cathode supply source minus 150.

We claim:

1. In a system for measuring the follow-up of a contact set having a stationary contact and a movable contact mounted on a contact carrier and an actuator for closing the contacts, the follow-up to be measured being equal to the movement of the movable contact carrier from contact touch to the limit of movement of the actuator, in combination, a position transducer comprising photo-electric means for providing an electrical signal in response to the movement of the contact carrier and said electrical signal having a characteristic proportional to the distance that said contact carrier moves, amplifier means responsive to said signal for providing a low impedance amplified output signal, indicator means coupled to the output of said amplifier means, switching means, means for conditioning said switching means to render said indicator means unresponsive to said amplified output signal during initial movement of the contact carrier, and means operable when the movable contact touches the stationary contact for conditioning said switching means to render said indicator means responsive to said amplified output signal thereby to indicate the follow-up of the contact set.

2. The invention defined in claim 1, wherein said photo-electric means comprises a light source, a photocell connected to said amplifier means, a shutter for controlling the amount of light impinging on said photo-cell from said light source, and magnetic means connecting the contact carrier to said shutter and readily disconnectable therefrom for operating the shutter in accordance with the movement of the contact carrier.

3. The invention defined in claim 1, wherein said means for conditioning said switching means comprises means for initially rendering said switching means operable to shunt said amplified output signal from said indicator means, and means responsive to said contact touch for rendering said switching means operable to effectively disconnect said shunt from said indicator means.

4. The invention defined in claim 1, wherein said switching means comprises static means rapidly responsive when the movable contact touches the stationary contact to render said indicator means responsive to said amplified output signal, and dynamic means operable when the movable contact touches the stationary contact for disconnecting said static means from said indicator means to insure that leakage current through said static means does not cause error in the indication.

5. The invention defined in claim 4, wherein said means for conditioning said switching means comprises a bi-stable network initially presettable to operate said static means and said dynamic means to shunt said amplified output signal from said indicator means, and means responsive to said contact touch for resetting said bi-stable network thereby to operate said static means and said dynamic means to effectively disconnect said shunt from said indicator means.

6. The invention defined in claim 4, wherein said means for conditioning said switching means comprises presettable means for initially operating said static means and said dynamic means to shunt said amplified output signal from said indicator means, and a gating device responsive to said contact touch for operating said static means and said dynamic means to effectively interrupt said shunt.

7. In a system for measuring a characteristic of a rapidly moving member, means for measuring a characteristic of the movement of the movable member during the time period between the start of movement thereof and the end of its travel against a stop comprising means operable to move said member, a transducer responsive to the whole range of movement of said member for developing an electrical signal which is a function of the movement of said member, amplifying means having a low impedance output for amplifying said signal and having means for transmitting said signal without significant delay, indicating means connected to the output of said amplifying means, switching means operable to maintain said indicating means unresponsive to an output signal from said amplifying means, first means for controlling said switching means to render said indicating means responsive to said output signal as soon as said member starts to move whereby said indicating means indicates a characteristic of the movement of said member from start of movement of the latter to the end of its travel, and second means for controlling said switching means to render said indicating means responsive to said output signal at a predetermined intermediate point in the travel of said member whereby said indicating means indicates a characteristic of the movement of said member from said intermediate point to the end of its travel.

8. In a measuring system, in combination:
   (a) means for measuring the distance of movement of a movable member from any one of a plurality of selectable points to the end of its travel comprising:
   (b) means operable to move said member;
   (c) a transducer responsive to the whole range of movement of said movable member for developing an electrical signal having a magnitude proportional to the distance that said member moves;
   (d) amplifying means having a low impedance output for amplifying said signal and having means for transmitting said signal without significant delay;
   (e) indicating means connected to the output of said amplifying means;
   (f) switching means operable normally to maintain said indicating means unresponsive to an output signal from said amplifying means;
   (g) and means responsive to said moving means for operating said switching means at said selected point to render said indicating means responsive to the output signal from said amplifying means whereby said indicating means indicates the distance said movable member moves from said selected point to the end of its travel.

9. The invention defined in claim 8, wherein said movable member comprises a carrier for a movable contact of an electric switch, said electric switch also being provided with a stationary contact connected to said switching means, an actuator for operating said movable contact, and a stop for said actuator.

10. The invention defined in claim 9, wherein said switching means comprises presettable means for rendering said indicating means unresponsive to initial movement of said contact carrier, and means responsive to initial closure of said movable contact with said stationary contact for rendering said indicating means responsive thereby to indicate the amount of movement of said contact carrier from said initial closure until said actuator abuts said stop.

11. The invention defined in claim 9, wherein said switching means comprises presettable means for rendering said indicating means unresponsive, and means for operating said electric switch and for rendering said indicating means responsive immediately before said contact carrier of said electric switch starts to move thereby to indicate the total stroke of said contact carrier.

12. The invention defined in claim 8, wherein said transducer comprises a light source, a shutter for admitting light from said source, a photo-electric device responsive to light from said source when said shutter is opened for applying an input signal to said amplifying means which has value proportional to the amount of light impinging thereon, and magnetic means for operating said shutter in accordance with the movement of the movable member.

13. In a measuring system, in combination:
   (a) means for measuring the distance of movement of a movable member from one of a plurality of selectable points to the end of its travel comprising:
   (b) manually controllable means for selecting any one of a plurality of different predetermined portions of the distance of movement of said member for measurement;
   (c) means operable to move said member;
   (d) a transducer operable by said member in response to movement thereof for developing an electrical signal having a magnitude proportional to the distance said member moves;
   (e) amplifying means having a low impedance output for amplifying said signal and having means for transmitting said signal without significant delay;
   (f) indicating means connected to the output of said amplifying means;
   (g) and means responsive to the output signal from said amplifying means under the control of said selecting means for causing said indicating means continuously to indicate while said member moves through said selected portion the distance that said member has moved beyond said selected point.

14. The invention defined in claim 13, wherein said selecting means comprises means responsive to the member reaching a predetermined position for rendering said indicating means operative thereby to afford an indication of the amount of movement of the member beyond said predetermined position.

15. The invention defined in claim 13, wherein said selecting means comprises means operative concurrently with initiation of movement of the member for rendering said indicating means operative thereby to afford an indication of the total amount of movement of the member.

16. A measuring system comprising:
   (a) means for measuring and indicating the distance that a member moves from one of a plurality of selectable points to the end of its travel, said means comprising:
   (b) means for moving the member;
   (c) a movement detecting transducer responsive to said movement of said member for developing an electrical signal having a magnitude which is proportional to the distance that said member moves;
   (d) indicating means;
   (e) means electrically coupling said transducer to said indicating means;

(f) switching means for selecting said one point from which the distance that said member moves is to be measured;

(g) and means responsive when said member is at said point for rendering said indicating means responsive to said signal whereby said indicating means thereafter responds to said signal as it increases in magnitude while said member moves toward the end of its travel thereby to indicate the distance between said selected point and the end of travel of said member.

17. In a system for measuring and indicating a characteristic of a movable member, in combination:

(a) means for moving the member;

(b) a movement responsive transducer comprising means moved by said member and being responsive to such movement for developing an electrical signal having a magnitude proportional to the distance that said member moves;

(c) means responsive to said first signal for developing a second signal having a magnitude proportional to the rate of change of said first signal whereby the magnitude of said second signal is also proportional to the velocity of movement of said member;

(d) and means responsive to said second signal for indicating the velocity of movement of said member.

18. The invention defined in claim 17, wherein said means for developing a second signal comprises:

(a) means for amplifying said first signal and affording a low impedance output;

(b) and means for transmitting said first signal through said amplifying means without significant delay.

19. The invention defined in claim 18, wherein said means for developing a second signal comprises:

(a) a capacitor and a linear resistor connected in series to the output of said amplifying means whereby the voltage appearing on said resistor has a magnitude proportional to the rate of change of the magnitude of said first signal;

(b) indicator means;

(c) and means for applying said voltage from said resistor to said indicator means to indicate the velocity of movement of said movable member.

References Cited in the file of this patent

UNITED STATES PATENTS

| | | |
|---|---|---|
| 2,083,945 | Evans | June 15, 1937 |
| 2,494,352 | Moyer | Jan. 10, 1950 |
| 2,502,450 | Gittings | April 4, 1950 |
| 2,699,529 | Wenk | Jan. 11, 1955 |
| 2,805,388 | Brown | Sept. 3, 1957 |
| 2,840,780 | Weeks | June 24, 1958 |